US012719861B2

(12) United States Patent
Nowak et al.

(10) Patent No.: US 12,719,861 B2
(45) Date of Patent: Aug. 25, 2026

(54) AUTHENTICATING USERS DURING AND AFTER SUSPICIOUS VOICE CALLS AND BROWSING

(71) Applicant: Capital One Services, LLC, McLean, VA (US)

(72) Inventors: Matthew Nowak, Midlothian, VA (US); Michael Anthony Young, Jr., Henrico, VA (US); Christopher Mcdaniel, Glen Allen, VA (US)

(73) Assignee: Capital One Services, LLC, McLean, VA (US)

(*) Notice: Subject to any disclaimer, the term of this patent is extended or adjusted under 35 U.S.C. 154(b) by 319 days.

(21) Appl. No.: 18/306,787

(22) Filed: Apr. 25, 2023

(65) Prior Publication Data

US 2024/0364684 A1 Oct. 31, 2024

(51) Int. Cl.
*H04W 12/02* (2009.01)
*H04L 9/40* (2022.01)
*H04M 7/00* (2006.01)
*H04W 12/06* (2021.01)

(52) U.S. Cl.
CPC ........ *H04L 63/0853* (2013.01); *H04M 7/006* (2013.01)

(58) Field of Classification Search
CPC .................................................. H04L 63/0853
USPC .............................................................. 726/6
See application file for complete search history.

(56) References Cited

U.S. PATENT DOCUMENTS 10,419,310 B1 * 9/2019 Liu ......................... H04L 43/16
10,805,291 B2 * 10/2020 Lee ..................... H04L 41/0873
10,867,024 B2 * 12/2020 Singhal ............... H04L 63/0853
11,076,001 B1 * 7/2021 Mohamed ............. H04L 47/803
11,080,385 B1 * 8/2021 Angara ............... H04W 12/068
11,567,786 B2 * 1/2023 Koren ................... G06F 3/0484
2011/0154459 A1 * 6/2011 Kuang .................... G06F 21/41 726/6
2013/0343533 A1 * 12/2013 Croak ................ H04M 15/8011 379/243

(Continued)

FOREIGN PATENT DOCUMENTS

CN 107810627 A * 3/2018 ........... H04L 67/146
CN 104902113 B * 10/2018 .......... H04M 7/0075

(Continued)

OTHER PUBLICATIONS

Jaynish Patel, "Design and Implementation of Heuristic based Phishing detection techniques" (2018), Masters Project Report, 33 pages, University of Victoria.

*Primary Examiner* — Haresh N Patel
(74) *Attorney, Agent, or Firm* — Harrity & Harrity, LLP

(57) ABSTRACT

In some implementations, a remote server may receive a request for authentication including a set of credentials associated with a user. The remote server may transmit, to a user device associated with the user, a request for a status associated with a browsing history of the user device or associated with recent emails viewed on the user device. The remote server may receive, from the user device, an indication of the status. The remote server may transmit a message based on the indication of the status and may determine whether to authenticate the user, using the set of credentials, based on the indication of the status.

20 Claims, 9 Drawing Sheets

(56) References Cited

U.S. PATENT DOCUMENTS

| | | | | |
|---|---|---|---|---|
| 2016/0055354 | A1* | 2/2016 | Jinaraj | G06F 21/44 726/36 |
| 2018/0181417 | A1* | 6/2018 | Nallapareddy | H04L 63/0892 |
| 2019/0066837 | A1* | 2/2019 | Hanrahan | G16H 80/00 |
| 2019/0132304 | A1* | 5/2019 | Overby | H04L 63/0853 |
| 2021/0312441 | A1* | 10/2021 | Dawson, V | H04L 63/10 |
| 2022/0124098 | A1* | 4/2022 | Shiralkar | H04L 63/20 |
| 2022/0272084 | A1* | 8/2022 | Hyatt | H04W 4/70 |
| 2023/0120160 | A1* | 4/2023 | Oh | H04L 63/0815 726/5 |
| 2023/0276205 | A1* | 8/2023 | Frendo | H04W 4/12 370/329 |
| 2023/0284016 | A1* | 9/2023 | Merchant | H04W 12/069 455/411 |
| 2023/0336662 | A1* | 10/2023 | Melendez | H04M 3/42068 |
| 2024/0364684 | A1* | 10/2024 | Nowak | H04M 7/006 |

FOREIGN PATENT DOCUMENTS

| | | | | | |
|---|---|---|---|---|---|
| CN | 105120120 | B | * | 3/2019 | |
| CN | 113315637 | A | * | 8/2021 | H04L 63/083 |
| DE | 112020003964 | T5 | * | 5/2022 | H04W 88/08 |
| EP | 4160986 | A1 | * | 4/2023 | H04L 9/3263 |
| JP | 2011091589 | A | * | 5/2011 | |
| JP | 5494203 | B2 | * | 5/2014 | |
| JP | 2018-88668 | A | | 6/2018 | |
| JP | 6612105 | B2 | | 11/2019 | |
| KR | 20180054801 | A | * | 5/2018 | H04L 67/142 |
| TW | 201336289 | A1 | | 9/2013 | |
| WO | 2021078226 | A1 | | 4/2021 | |

* cited by examiner

400

AUTHENTICATING USERS DURING AND AFTER SUSPICIOUS VOICE CALLS AND BROWSING

BACKGROUND

Users often access remote services over the Internet by logging into a website or otherwise authenticating themselves remotely. In addition to laptop and desktop computers, users may also access remote services on mobile devices, such as smartphones.

SUMMARY

Some implementations described herein relate to a system for authenticating a user. The system may include one or more memories and one or more processors communicatively coupled to the one or more memories. The one or more processors may be configured to receive a request for authentication including a set of credentials associated with the user. The one or more processors may be configured to transmit, to a user device associated with the user, a request for a status associated with a cellular connection of the user device or associated with one or more voice over Internet protocol ports of the user device. The one or more processors may be configured to receive, from the user device, an indication of the status. The one or more processors may be configured to transmit a request for confirmation based on the indication of the status. The one or more processors may be configured to receive an indication of the confirmation. The one or more processors may be configured to authenticate the user, using the set of credentials, based on the indication of the confirmation.

Some implementations described herein relate to a method of authenticating a user. The method may include receiving a request for authentication including a set of credentials associated with the user. The method may include transmitting, to a user device associated with the user, a request for a status associated with a browsing history of the user device or associated with recent emails viewed on the user device. The method may include receiving, from the user device, an indication of the status. The method may include transmitting a message based on the indication of the status. The method may include determining whether to authenticate the user, using the set of credentials, based on the indication of the status.

Some implementations described herein relate to a non-transitory computer-readable medium that stores a set of instructions for authenticating a user. The set of instructions, when executed by one or more processors of a device, may cause the device to detect that the user is requesting authentication with a remote service. The set of instructions, when executed by one or more processors of the device, may cause the device to receive a browsing history of the device or an indication of recent emails viewed on the device. The set of instructions, when executed by one or more processors of the device, may cause the device to determine whether to allow the user to proceed with the authentication based on the browsing history or the indication of recent emails.

DETAILED DESCRIPTION

The following detailed description of example implementations refers to the accompanying drawings. The same reference numbers in different drawings may identify the same or similar elements.

A user may log into a remote service for a variety of reasons. For example, the user may wish to check a status (e.g., a cancellation status or a balance, among other examples) or a setting (e.g., a communication setting or contact information, among other examples) associated with an account of the user associated with the remote service. Additionally, or alternatively, the user may instruct the remote service to perform an action (e.g., change a password, complete an order, or transfer money, among other examples). However, the user may log into the remote service in response to a scam. For example, the user may answer a phone call that is not authorized by the remote service and log into the remote service based on instructions received on the phone call. In another example, the user may view an email that was not authorized by the remote service or visit a website that is not authorized by the remote service and log into the remote service based on instructions in the email or on the website.

When the user instructs the remote service to perform an action based on an unauthorized phone call, an unauthorized email, or an unauthorized website, the remote service wastes power and processing resources in performing the action that the user otherwise would not have requested. Additionally, the user may wish to undo the action once the user discovers the scam. However, undoing the action will consume power and processing resources at a user device of the user as well as at the remote service.

Some implementations described herein enable a remote service to detect that a user is on an unauthorized phone call or has recently viewed an unauthorized email or an unauthorized website and thus alert the user when the user attempts to access the remote service. As a result, security is improved. Additionally, the remote service prevents a user device from instructing the remote service to perform actions that the user otherwise would not have requested, which conserves power and processing resources at the user device as well as at the remote service. Additionally, any actions prevented will not need to be undone in the future, which further conserves power and processing resources that the user device and the remote service otherwise would have expended in undoing the actions.

Figure 1A:
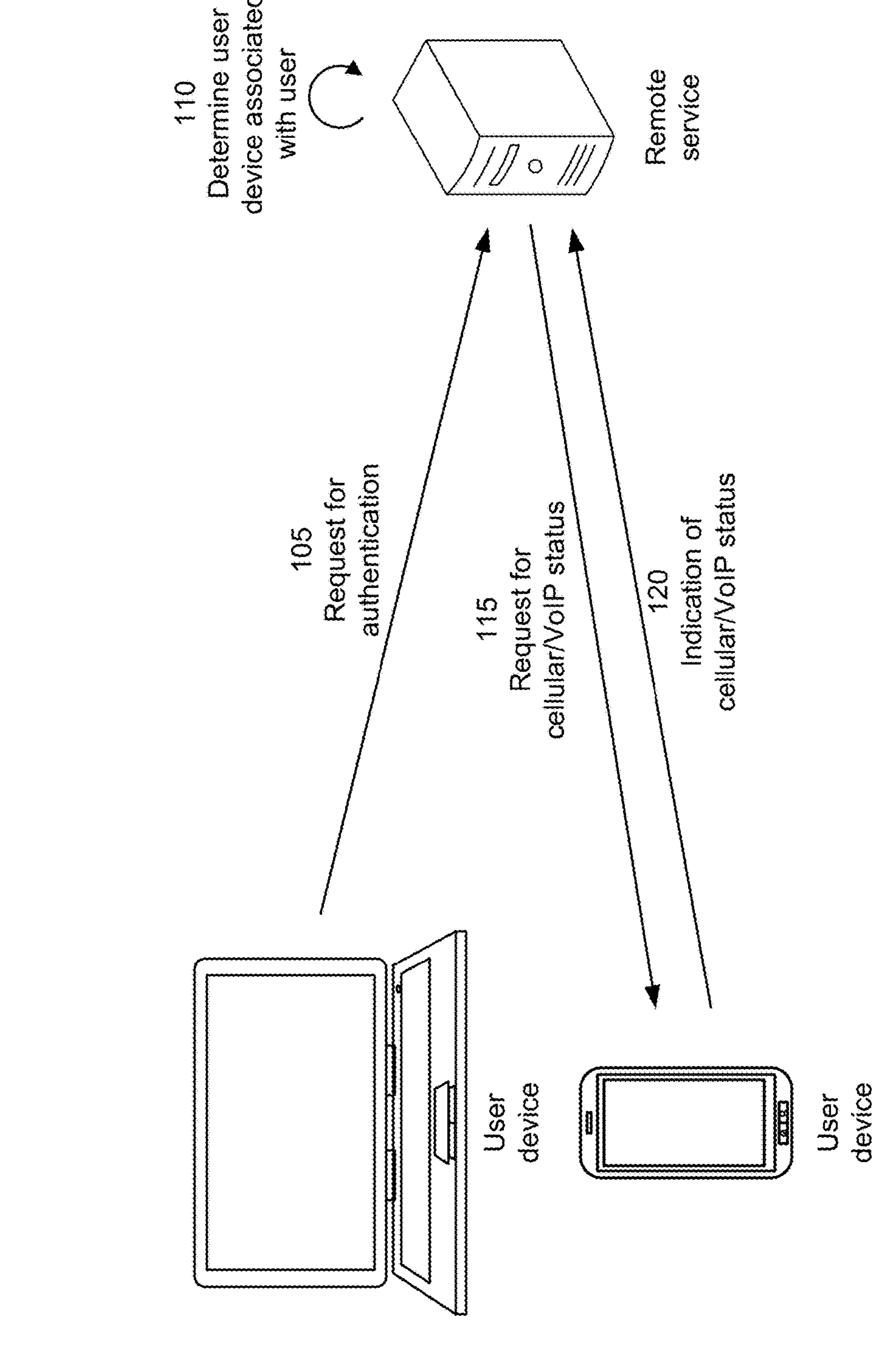
FIGS. 1A-1B are diagrams of an example implementation relating to authenticating users during a suspicious call, in accordance with some embodiments of the present disclosure.
Figure 1B:
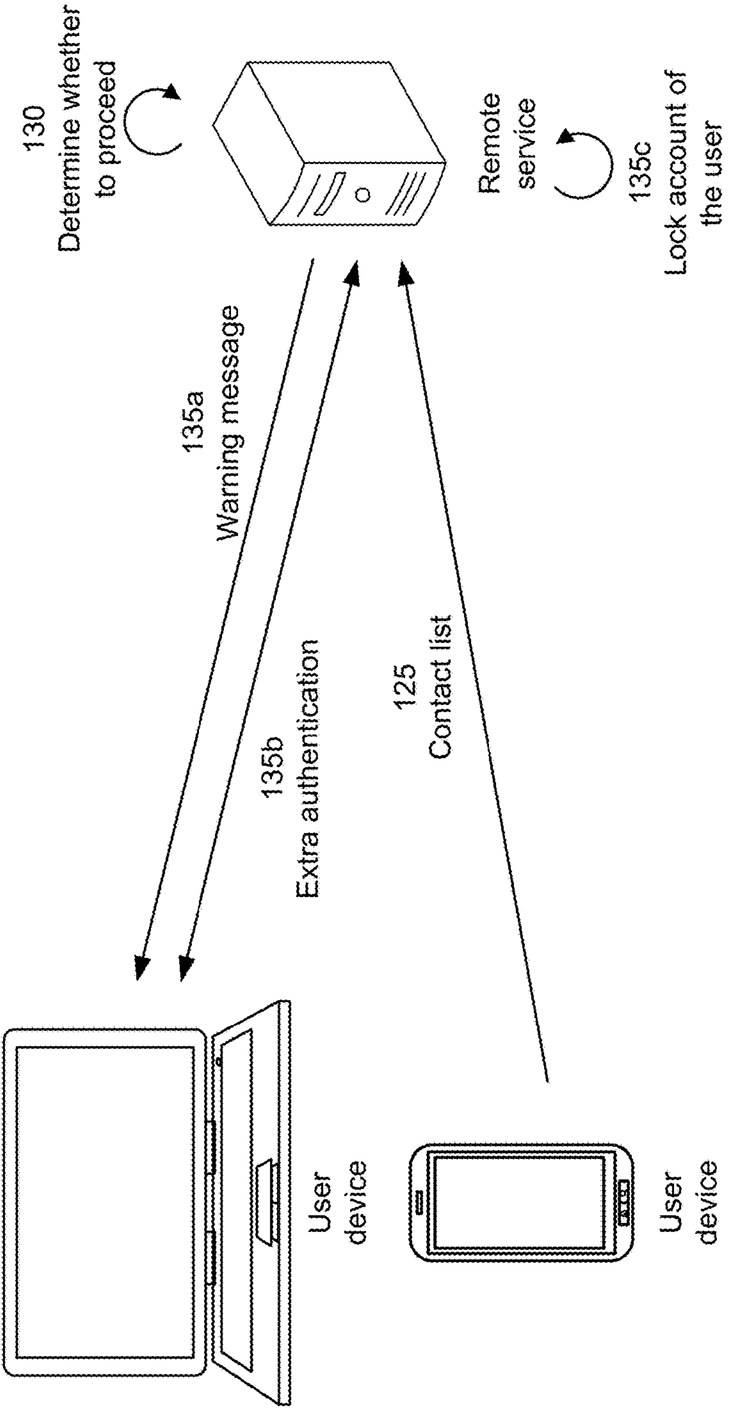

FIGS. 1A-1B are diagrams of an example 100 associated with authenticating users during a suspicious call. As shown in FIGS. 1A-1B, example 100 includes user devices and a remote service. These devices are described in more detail in connection with FIGS. 4 and 5.

As shown by reference number 105, a first user device may transmit, and the remote service may receive, a request for authentication. In some implementations, a user of the first user device may provide input (e.g., via an input component) that instructs the first user device to transmit the request for authentication to the remote service. In one example, the user may navigate to a website (e.g., using a web browser executed by the first user device) hosted by, or otherwise associated with, the remote service and may interact with the website in order to instruct the first user device to transmit the request for authentication. In another example, the user may interact with a mobile application (also referred to as an "app") in order to instruct the first user device to perform an application programming interface (API) call and thus transmit the request for authentication. Alternatively, the first user device may automatically (e.g., based on a schedule) transmit the request for authentication to the remote service.

The request may include a set of credentials associated with the user. For example, the request may include a username and password, a passcode, biometric information, and/or another type of information that uniquely (or at least quasi-uniquely) identifies the user. The set of credentials quasi-uniquely identify the user when the set of credentials is unique to the user relative to the superset of credentials associated with the remote service but is not unique to the user relative to the superset of all credentials. In some implementations, the first user device may include the set of credentials in a same message as the request. Alternatively, the first user device may transmit the set of credentials subsequent to the request (e.g., based on a response to the request from the remote service). The first user device may encrypt the set of credentials before transmitting the encrypted set of credentials. For example, the first user device may apply a public-private key pair encryption technique or a symmetric-key encryption technique (e.g., an Advanced Encryption Standard (AES) technique), among other examples.

Before authenticating the user based on the set of credentials, the remote service may verify whether the user is engaged in a voice call (whether including video or not). Accordingly, as shown by reference number 110, the remote service may determine a user device associated with the user. For example, an account of the user associated with the remote service may be associated with a particular user device. In one example, the user may provide an identifier of the particular user device when creating the account (e.g., registering with the remote service). The user may provide a unique identifier, such as a device name, a serial number, or another alphanumeric sequence associated with the particular user device, and/or a quasi-unique identifier, such as an international mobile subscriber identity (IMSI), an Internet protocol (IP) address, or a medium access control (MAC) address, among other examples. In another example, the user may provide the identifier of the particular user device when modifying a setting associated with the account.

As shown in FIG. 1A, the remote service may determine a second user device distinct from the first user device. For example, the user may instruct a laptop or a desktop computer to transmit the request, and the remote service may determine that the account is associated with a smartphone of the user. Alternatively, the remote service may determine the first user device. For example, the user may instruct a smartphone to transmit the request, and the remote service may determine that the account is associated with the same smartphone.

As shown by reference number 115, the remote service may transmit, and the second user device may receive, a request for a status associated with a cellular connection of the second user device or associated with one or more voice over IP (VOIP) ports of the second user device. The remote service may transmit the request based on determining the second user device. In some implementations, the user may have authorized the remote service to request a cellular status and/or a VoIP status from an operating system (OS) of the second user device. For example, the user may have provided authorization when creating the account (e.g., registering with the remote service). Alternatively, the user may have provided authorization when installing an app on the second user device or when modifying a setting associated with the account.

As shown by reference number 120, the second user device may transmit, and the remote service may receive, an indication of the status. For example, the second user device may indicate whether the second user device is engaged in a cellular call or is using a VoIP port for a call. In some implementations, the indication may be a Boolean or another type of bit indicating the status (e.g., '0' or FALSE to indicate no ongoing call and '1' or TRUE to indicate an ongoing call). In some implementations, the second user device may additionally indicate a phone number and/or a contact name associated with the ongoing call.

Although the example 100 is described in connection with the user device transmitting the indication of the status in response to the request from the remote service, other examples may include the user device transmitting the indication of the status based on detecting that the user is requesting authentication with the remote service (e.g., similarly as described in connection with reference number 210 of FIG. 2A).

Although described as indicating an ongoing call, the second user device may additionally or alternatively indicate whether the second user device was engaged in a cellular call or was using a VoIP port for a call within a time window. For example, the second user device may indicate whether the second user device was engaged in a cellular call or was using a VoIP port for a call within the past 30 seconds, the past minute, or the past two minutes, among other examples. Accordingly, as used herein, "recent call" refers to a call that occurred within a time window but not before a manufacture of a device engaged in the recent call. The time window may be a default value (e.g., stored in a memory of the second user device) or may be indicated by the remote service (e.g., indicated in the request for the status or stored in the memory of the second user device based on a previous message from the remote service). In some implementations, the indication may be a Boolean or another type of bit indicating the status (e.g., '0' or FALSE to indicate no recent call and '1' or TRUE to indicate a recent call). In some implementations, the second user device may additionally indicate a phone number and/or a contact name associated with the recent call.

In some implementations, as shown in FIG. 1B and by reference number 125, the second user device may additionally transmit, and the remote service may additionally receive, a contact list (e.g., stored on the second user device, such as in the memory of the second user device). In one example, the second user device may transmit the contact list in a same message as the indication of the status. Alternatively, the second user device may transmit the contact list subsequent to the indication of the status. Accordingly, the remote service may use the contact list to determine whether an ongoing call (and/or a recent call) is suspicious, as described in connection with reference number 130.

Although described in connection with the second user device transmitting the contact list, the second user device may instead indicate whether an ongoing call (and/or a recent call) is associated with the contact list. For example, the second user device may transmit a Boolean or another type of bit indicating whether the call is associated with the contact list (e.g., '0' or FALSE to indicate that the call is or was with a phone number or a user not included in the contact list and '1' or TRUE to indicate that the call is or was with a phone number or a user included in the contact list). Accordingly, the second user device conserves network overhead that otherwise would have been used to transmit the entire contact list.

As shown by reference number 130, the remote service may determine whether to authenticate the user, using the set of credentials, based on the indication of the status. For example, the remote service may determine to authenticate the user based on there being no ongoing call (or recent call) but may determine not to authenticate the user (or determine to provide an additional warning, as described in connection with reference number 135*a*, or to conduct additional authentication, as described in connection with reference number 135*b*) based on there being an ongoing call (and/or a recent call).

In some implementations, the remote service may determine whether to authenticate the user based on whether an ongoing call (or recent call) is associated with an administrator who is associated with the remote service. For example, the remote service may transmit a request to a telecommunications device (e.g., a switchboard or a VoIP server, among other examples) for a status associated with the administrator and may receive an indication of whether the administrator is associated with the ongoing call (or recent call). Accordingly, the remote service may determine to authenticate the user based on the ongoing call (or recent call) being associated with the administrator but may determine not to authenticate the user (or determine to provide an additional warning, as described in connection with reference number 135*a*, or to conduct additional authentication, as described in connection with reference number 135*b*) based on the ongoing call (or recent call) not being associated with the administrator. Therefore, the remote service may determine that the ongoing call (or recent call) is suspicious when not associated with the administrator.

Additionally, or alternatively, the remote service may determine whether to authenticate the user based on whether an ongoing call (or recent call) is associated with the contact list. For example, the remote service may receive the contact list (or an indication of whether the ongoing call and/or recent call is associated with the contact list), as described in connection with reference number 125. Accordingly, the remote service may determine to authenticate the user based on the ongoing call (or recent call) being associated with the contact list but may determine not to authenticate the user (or determine to provide an additional warning, as described in connection with reference number 135*a*, or to conduct additional authentication, as described in connection with reference number 135*b*) based on the ongoing call (or recent call) not being associated with the contact list. Therefore, the remote service may determine that the ongoing call (or recent call) is suspicious when not associated with the contact list. In a combinatory example, the remote service may determine that the ongoing call (or recent call) is suspicious when not associated with the contact list and not associated with the administrator.

As described above, the remote service may use a set of rules to determine whether to authenticate the user. Additionally, or alternatively, the remote service may apply a suspicion model to information from the first user device (e.g., any indications described herein and/or the contact list) to determine a score or another type of indicator associated with a suspicion level for an ongoing call (and/or a recent call). Accordingly, the remote service may authenticate the user based on the score satisfying a suspicion threshold. Similarly, the remote service may determine not to authenticate the user (or determine to provide an additional warning, as described in connection with reference number 135*a*, or to conduct additional authentication, as described in connection with reference number 135*b*) based on the score failing to satisfy the suspicion threshold.

In some implementations, and as shown by reference number 135*a*, the remote service may transmit, and the first user device may receive, a message based on the indication of the status. For example, the remote service may determine to provide an additional warning, as described above. Accordingly, the remote service may transmit an instruction to warn the user about a possible scam based on the indication of the status (e.g., being associated with a suspicious phone call).

Additionally, or alternatively, and as shown by reference number 135*b*, the remote service may perform extra authentication. For example, the remote service may transmit, and the first user device may receive, a request for confirmation based on the indication of the status (e.g., being associated with a suspicious phone call). Therefore, the first user device may transmit, and the remote service may receive, a confirmation message in response to the request for confirmation. In one example, the user may interact with a web browser executed by the first user device in order to instruct the first user device to transmit the confirmation message. In another example, the user may interact with an app executed by the first user device (or with a push notification generated by the app) in order to instruct the first user device to perform an API call and thus transmit the confirmation message. Accordingly, the remote service may perform authentication in response to the confirmation message.

In addition to, or in lieu of, transmitting a request for confirmation, the remote service may perform a two-factor authorization process based on the indication of the status (e.g., being associated with a suspicious phone call). For example, the remote service may transmit a security code (e.g., an alphanumeric code) to a phone number (e.g., via a voice call or a text message) or to an email address associated with the account of the user. Accordingly, the first user device may transmit the security code to the remote service. In one example, the user may interact with a web browser executed by the first user device in order to instruct the first user device to transmit the security code. In another example, the user may interact with an app executed by the first user device (or with a push notification generated by the app) in order to instruct the first user device to perform an API call with the security code as a parameter. Additionally, or alternatively, the remote service may transmit a prompt (e.g., a security question) associated with the account of the user to the first user device. Accordingly, the first user device may transmit a response (e.g., a security answer) to the remote service. In one example, the user may interact with a web browser executed by the first user device in order to instruct the first user device to transmit the response. In another example, the user may interact with an app executed by the first user device (or with a push notification generated by the app) in order to instruct the first user device to perform an API call with the response as a parameter. Accordingly, the remote service may perform authentication in response to the two-factor authorization process.

Alternatively, the remote service may refrain from authenticating the user. For example, as shown by reference number 135*c*, the remote service may lock the account of the user based on the suspicious call. Accordingly, the account may remain locked until the user contacts the administrator associated with the remote service. Additionally, or alternatively, the user may perform (e.g., using the first user device and/or the second user device) an unlocking process (e.g., similar to the two-factor authorization process described herein).

Although the example 100 is described in response to the request for authorization, other examples may be performed in response to a request for an action. For example, the remote service may have already authenticated the user. Accordingly, the first user device may transmit, and the remote service may receive, a request to perform an action, and the remote service may determine that the action is sensitive (e.g., included on a list of sensitive actions). Accordingly, the remote service may transmit, and the second user device may receive, a request for a status associated with a cellular connection of the second user device or associated with one or more VoIP ports of the second user device. Therefore, the second user device may transmit, and the remote service may receive, an indication of the status, such that the remote service may determine whether to perform the action based on the indication of the status. For example, the remote service may determine to perform the action based on an ongoing call (and/or a recent call) not being suspicious but may determine not to perform the action (or determine to provide an additional warning, as described in connection with reference number 135*a*, or to conduct additional authentication, as described in connection with reference number 135*b*) based on the ongoing call (and/or recent call) being suspicious.

In some implementations, the remote service may delete information received from the second user device (e.g., any indications described herein and/or the contact list) after determining whether to authenticate the user. As a result, the remote service increases security as well as conserving memory overhead.

Alternatively, the remote service may use the information received from the second user device to re-train the suspicion model. For example, the remote service may tag the phone number associated with the ongoing call (or recent call) as not suspicious in response to the first user device transmitting the confirmation message and/or performing the two-factor authorization process, as described above. Alternatively, the remote service may tag the phone number associated with the ongoing call (or recent call) as suspicious in response to the first user device refraining from transmitting the confirmation message and/or performing the two-factor authorization process. For example, the user may cease requesting authentication with the remote service in response to a warning message from the remote service, as described above. Accordingly, the remote service may perform a re-training of the suspicion model using the tagged phone number.

Although the example 100 is described as implemented on the remote service, other examples may locally determine whether to authenticate the user on the first user device. For example, the first user device may detect that the user is requesting authentication with the remote service (e.g., as described in connection with reference number 205 of FIG. 2A) and may determine whether to proceed with transmitting the request for authentication based on the indication of the status. For example, the first user device may determine to transmit the request for authentication based on an ongoing call (and/or a recent call) not being suspicious but may determine not to transmit the request for authentication (or determine to provide an additional warning, similarly as described in connection with reference number 135*a*) based on the ongoing call (and/or recent call) being suspicious.

By using techniques as described in connection with FIGS. 1A-1B, the remote service may determine whether to authenticate the user based on whether there is an ongoing call (and/or a recent call). As a result, security is improved. Additionally, the remote service prevents the first user device from instructing the remote service to perform actions that the user otherwise would not have requested, which conserves power and processing resources at the first user device as well as at the remote service. Additionally, any actions prevented will not need to be undone in the future, which further conserves power and processing resources that the first user device and the remote service otherwise would have expended in undoing the actions.

As indicated above, FIGS. 1A-1B are provided as an example. Other examples may differ from what is described with regard to FIGS. 1A-1B.

Figure 2A:
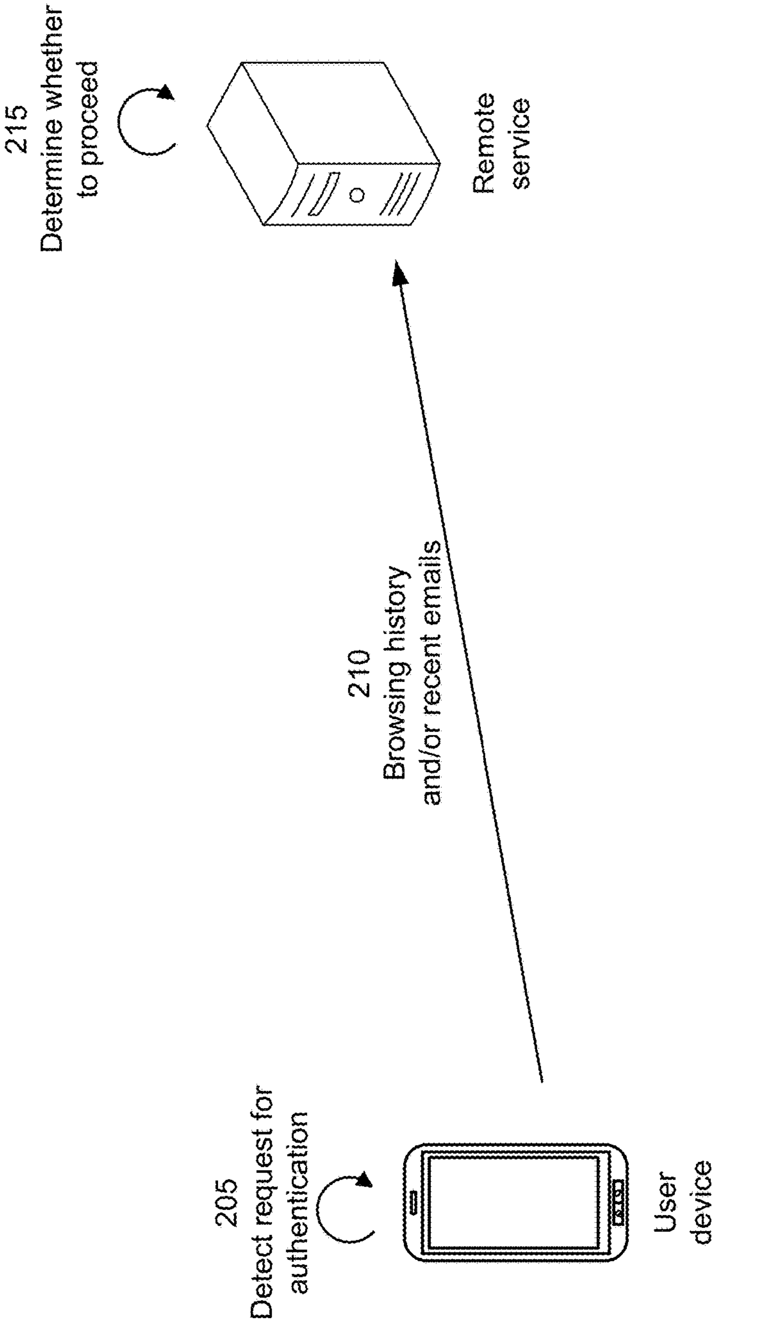
FIGS. 2A-2B are diagrams of an example implementation relating to authenticating users after the users have viewed a suspicious email or website, in accordance with some embodiments of the present disclosure.
Figure 2B:
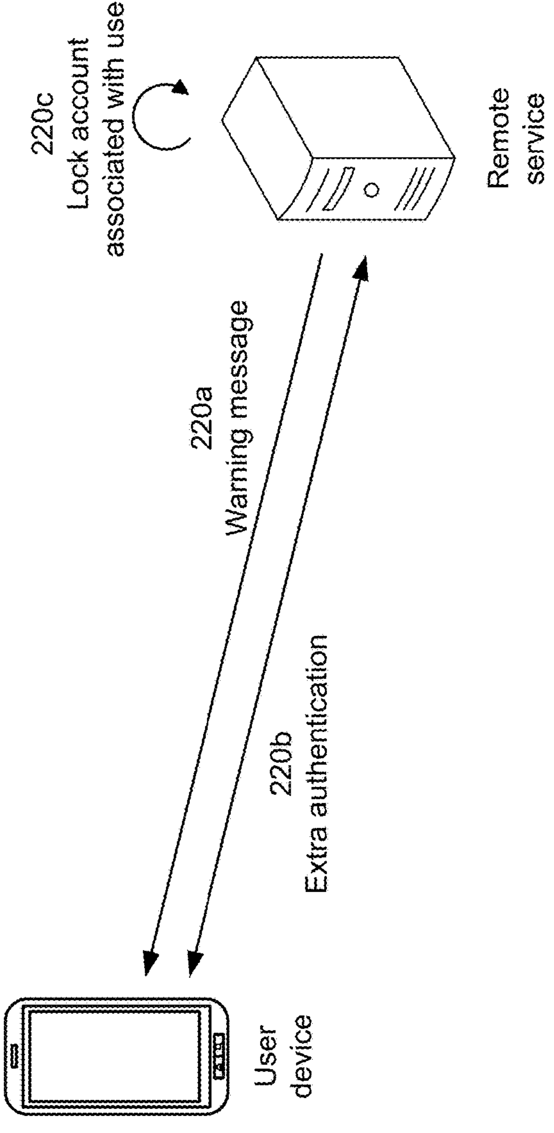

FIGS. 2A-2B are diagrams of an example 200 associated with authenticating users after the users have viewed a suspicious email or website. As shown in FIGS. 2A-2B, example 200 includes a user device and a remote service. These devices are described in more detail in connection with FIGS. 4 and 5.

As shown in FIG. 2A and by reference number 205, the user device may detect that a user of the user device is requesting authentication with the remote service. In some implementations, the user of the user device may provide input (e.g., via an input component) that instructs the user device to transmit a request for authentication to the remote service. In one example, the user may navigate to a website (e.g., using a web browser executed by the user device) hosted by, or otherwise associated with, the remote service and may interact with the website in order to instruct the user device to transmit the request for authentication. In another example, the user may interact with an app in order to instruct the user device to perform an API call and thus transmit the request for authentication. Alternatively, the user device may automatically (e.g., based on a schedule) generate the request for authentication to the remote service.

Before transmitting the request for authentication, the user device may ask the remote service to determine whether the user viewed a suspicious website and/or a suspicious email. Accordingly, as shown by reference number 210, the user device may transmit, and the remote service may receive, a browsing history of the user device or an indication of recent emails viewed on the user device. In some implementations, the user may have authorized the remote service to request the browsing history or the recent emails from an OS of the user device (or from an app supported by the OS). For example, the user may have provided authorization when creating the account (e.g., registering with the remote service). Alternatively, the user may have provided authorization when installing an app on the user device or when modifying a setting associated with the account.

Although the example 200 is described in connection with the user device transmitting the browsing history or the recent emails based on detecting that the user is requesting authentication with the remote service, other examples may include the remote service transmitting, and the user device receiving, a request for the browsing history or the recent emails in response to the request for authentication from the user device (e.g., similarly as described in connection with reference number 115 of FIG. 1A). Accordingly, the user device may transmit the browsing history or the recent emails in response to the request from the remote service (e.g., similarly as described in connection with reference number 120 of FIG. 1A).

As shown in FIG. 2A, the user device generating the request for authentication is the same user device that transmits the browsing history or the recent emails. Alternatively, the user device that transmits the browsing history or the recent emails may be a distinct device from the user device that generates the request for authentication (e.g., similarly as shown in FIG. 1A). Accordingly, the remote service may determine the user device from which to request the browsing history or the recent emails (e.g., similarly as described in connection with reference number 110 of FIG. 1A). For example, the user may instruct a laptop or a desktop computer to transmit the request for authentication, and the remote service may determine that the account is associated with a smartphone of the user.

In some implementations, the user device may transmit the browsing history or the recent emails within a time window. For example, the user device may transmit the browsing history associated with, or indicate emails viewed within, the past 30 seconds, the past minute, or the past two minutes, among other examples. The time window may be a default value (e.g., stored in a memory of the user device) or may be indicated by the remote service (e.g., indicated in the request for the browsing history or the recent emails or stored in the memory of the user device based on a previous message from the remote service).

As shown by reference number 215, the remote service may determine whether to allow the user to proceed with authentication based on the browsing history and/or the recent emails. For example, the remote service may determine to authenticate the user based on the browsing history not including a website from a list of suspicious websites (e.g., a list of domain names and/or a list of IP addresses, among other examples) and/or based on the recent emails not including an email message associated with a list of suspicious sources (e.g., a list of email addresses, a list of email hosting domain names, and/or a list of source IP addresses, among other examples) but may determine not to authenticate the user (or determine to provide an additional warning, as described in connection with reference number 220*a*, or to conduct additional authentication, as described in connection with reference number 220*b*) based on the browsing history including a website from the list of suspicious websites and/or based on the recent emails including an email message associated with the list of suspicious sources.

Additionally, or alternatively, the remote service may determine whether to authenticate the user based on whether a website (in the browsing history) is associated with a favorites list and/or an email message (in the recent emails) is associated with a contact list. For example, the remote service may receive the contact list (or an indication of whether the email message is associated with the contact list), as described in connection with reference number 125 of FIG. 1B. Additionally, or alternatively, the remote service may similarly receive the favorites list (or an indication of whether the website is associated with the favorites list). Accordingly, the remote service may determine to authenticate the user based on the website being associated with the favorites list and/or the email message being associated with the contact list but may determine not to authenticate the user (or determine to provide an additional warning, as described in connection with reference number 220*a*, or to conduct additional authentication, as described in connection with reference number 220*b*) based on the website not being associated with the favorites list and/or the email message not being associated with the contact list. Therefore, the remote service may determine that the website (or the email message) is suspicious when not associated with the favorites list (or not associated with the contact list).

As described above, the remote service may use a set of rules to determine whether to authenticate the user. Additionally, or alternatively, the remote service may apply a suspicion model to information from the user device (e.g., the browsing history and/or the recent emails) to determine a score or another type of indicator associated with a suspicion level. Accordingly, the remote service may authenticate the user based on the score satisfying a suspicion threshold. Similarly, the remote service may determine not to authenticate the user (or determine to provide an additional warning, as described in connection with reference number 220*a*, or to conduct additional authentication, as described in connection with reference number 220*b*) based on the score failing to satisfy the suspicion threshold.

In some implementations, and as shown by reference number 220*a*, the remote service may transmit, and the user device may receive, a message based on the browsing history and/or the recent emails. For example, the remote service may determine to provide an additional warning, as described above. Accordingly, the remote service may transmit an instruction to warn the user about a possible scam based on the browsing history (e.g., including a suspicious website) and/or the recent emails (e.g., including a suspicious email message).

Additionally, or alternatively, and as shown by reference number 220*b*, the remote service may perform extra authentication. For example, the remote service may transmit, and the user device may receive, a request for confirmation based on the browsing history (e.g., including a suspicious website) and/or the recent emails (e.g., including a suspicious email message). Therefore, the user device may transmit, and the remote service may receive, a confirmation message in response to the request for confirmation. In one example, the user may interact with a web browser executed by the user device in order to instruct the user device to transmit the confirmation message. In another example, the user may interact with an app executed by the user device (or with a push notification generated by the app) in order to instruct the user device to perform an API call and thus transmit the confirmation message. Accordingly, the remote service may perform authentication in response to the confirmation message.

In addition to, or in lieu of, transmitting a request for confirmation, the remote service may perform a two-factor authorization process based on the browsing history (e.g., including a suspicious website) and/or the recent emails (e.g., including a suspicious email message). For example, the remote service may transmit a security code (e.g., an alphanumeric code) to a phone number (e.g., via a voice call or a text message) or to an email address associated with the account of the user. Accordingly, the user device may transmit the security code to the remote service. In one example, the user may interact with a web browser executed by the user device in order to instruct the user device to transmit the security code. In another example, the user may interact with an app executed by the user device (or with a push notification generated by the app) in order to instruct the user device to perform an API call with the security code as a parameter. Additionally, or alternatively, the remote service may transmit a prompt (e.g., a security question) associated with the account of the user to the user device. Accordingly, the user device may transmit a response (e.g., a security answer) to the remote service. In one example, the user may interact with a web browser executed by the user device in order to instruct the user device to transmit the response. In another example, the user may interact with an app executed by the user device (or with a push notification generated by the app) in order to instruct the user device to perform an API call with the response as a parameter. Accordingly, the remote service may perform authentication in response to the two-factor authorization process.

Alternatively, the remote service may refrain from authenticating the user. For example, as shown by reference number 220*c*, the remote service may lock the account of the user based on the suspicious website and/or the suspicious email address. Accordingly, the account may remain locked until the user contacts an administrator associated with the remote service. Additionally, or alternatively, the user may perform (e.g., using the user device) an unlocking process (e.g., similar to the two-factor authorization process described herein).

Although the example 200 is described in response to the request for authorization, other examples may be performed in response to a request for an action. For example, the remote service may have already authenticated the user. Accordingly, the user device may transmit, and the remote service may receive, a request to perform an action, and the remote service may determine that the action is sensitive (e.g., included on a list of sensitive actions). Accordingly, the remote service may transmit, and the user device may receive, a request for a browsing history of the user device or an indication of recent emails viewed on the user device. Therefore, the user device may transmit, and the remote service may receive, the browsing history and/or the recent emails, such that the remote service may determine whether to perform the action based on the browsing history and/or the recent emails. For example, the remote service may determine to perform the action based on the browsing history not including a suspicious website and/or based on the recent emails not including a suspicious email message but may determine not to perform the action (or determine to provide an additional warning, as described in connection with reference number 220*a*, or to conduct additional authentication, as described in connection with reference number 220*a*) based on the browsing history including a suspicious website and/or based on the recent emails including a suspicious email message.

In some implementations, the remote service may delete information received from the user device (e.g., the browsing history the recent emails, the favorites list, the contact list, and/or any indications described herein) after determining whether to authenticate the user. As a result, the remote service increases security as well as conserving memory overhead.

Alternatively, the remote service may use the information received from the user device to re-train the suspicion model. For example, the remote service may tag a website (from the browsing history) or an email message as not suspicious in response to the user device transmitting the confirmation message and/or performing the two-factor authorization process, as described above. Alternatively, the remote service may tag a website (from the browsing history) or an email message as suspicious in response to the user device refraining from transmitting the confirmation message and/or performing the two-factor authorization process. For example, the user may cease requesting authentication with the remote service in response to a warning message from the remote service, as described above. Accordingly, the remote service may perform a re-training of the suspicion model using the tagged phone number.

Although the example 200 is described as implemented on the remote service, other examples may locally determine whether to authenticate the user on the user device. For example, the user device may determine whether to proceed with transmitting the request for authentication based on the browsing history and/or the recent emails. For example, the user device may determine to transmit the request for authentication based on a website (from the browsing history) or an email message not being suspicious but may determine not to transmit the request for authentication (or determine to provide an additional warning, similarly as described in connection with reference number 135*a*) based on the website or the email message being suspicious.

By using techniques as described in connection with FIGS. 2A-2B, the user device may determine whether to transmit the request for authentication based on whether the user recently viewed a suspicious website and/or a suspicious email. As a result, security is improved. Additionally, the user device refrains from instructing the remote service to perform actions that the user otherwise would not have requested, which conserves power and processing resources at the user device as well as at the remote service. Additionally, any actions the user device refrained from instructing will not need to be undone in the future, which further conserves power and processing resources that the user device and the remote service otherwise would have expended in undoing the actions.

As indicated above, FIGS. 2A-2B are provided as an example. Other examples may differ from what is described with regard to FIGS. 2A-2B.

Figure 3A:
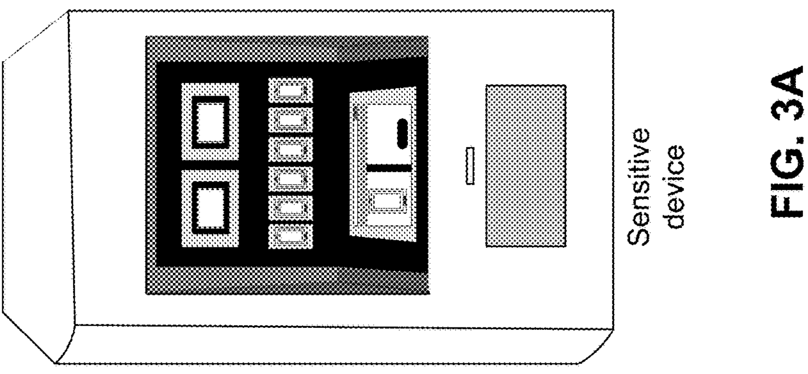
FIGS. 3A-3B are diagrams of an example implementation relating to authenticating users near a sensitive device, in accordance with some embodiments of the present disclosure.
Figure 3A:
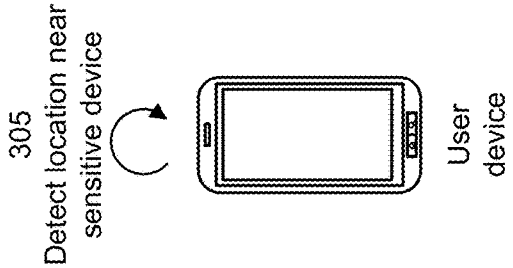
Figure 3B:
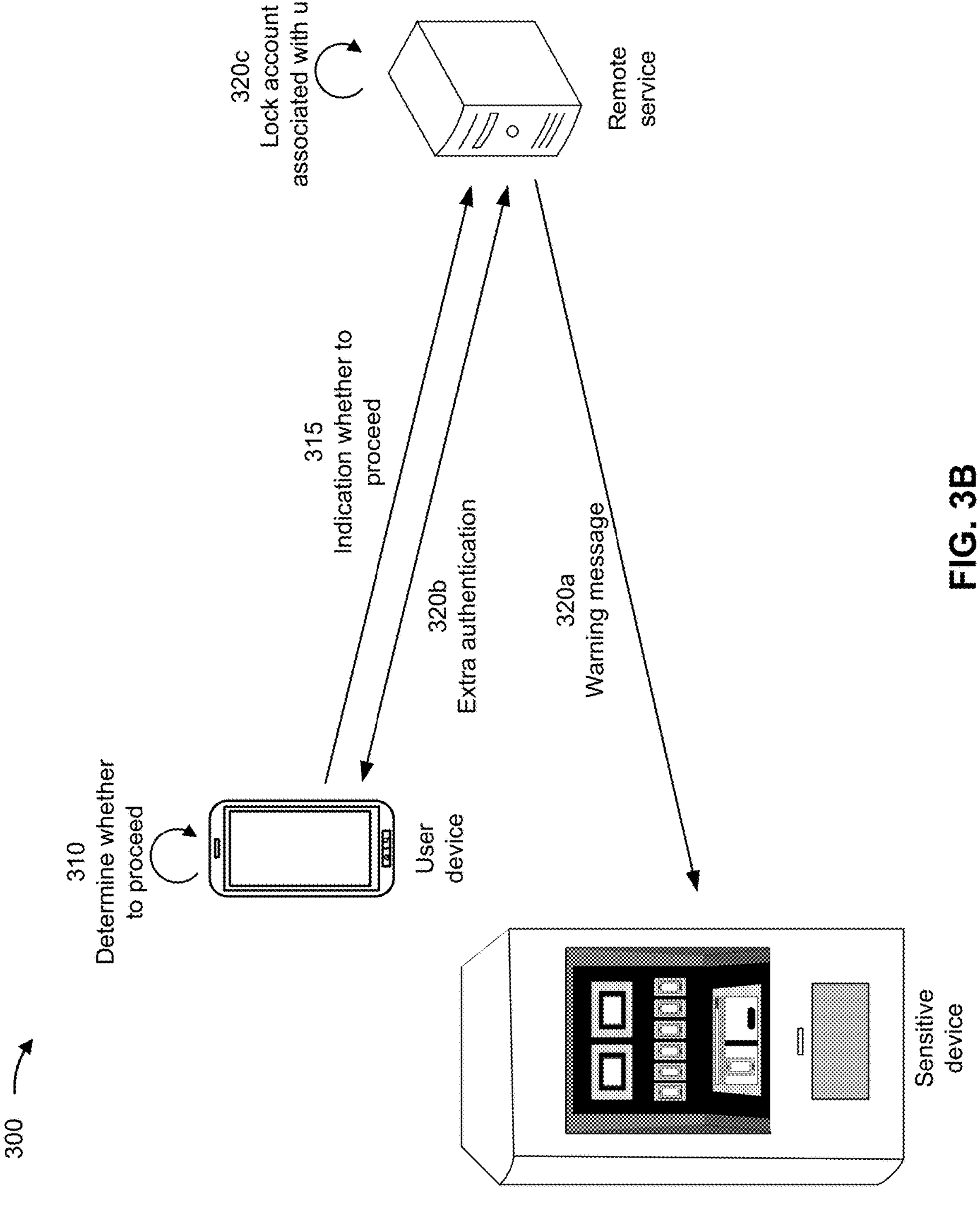

FIGS. 3A-3B are diagrams of an example 300 associated with authenticating users near a sensitive device. As shown in FIGS. 3A-3B, example 300 includes a user device, a sensitive device, and a remote service. These devices are described in more detail in connection with FIGS. 4 and 5.

As shown in FIG. 3A and by reference number 305, the user device may detect that a location of the user device is near the sensitive device (e.g., located at a distance from the sensitive device that satisfies a distance threshold). For example, the user device may determine that a global navigation satellite system (GNSS) location associated with the user device is near a stored location (e.g., in a data structure on a memory of the user device) associated with the sensitive device. Additionally, or alternatively, the user device may measure a signal broadcast by the sensitive device (e.g., a Bluetooth® signal or another type of wireless signal) to estimate the location of the user device relative to the sensitive device. As used herein, “sensitive device” refers to a device that can be instructed to perform an action based on authenticating the user. For example, the sensitive device may include an automated teller machine (ATM), a point-of-sale (PoS) system, and/or another type of front-end device.

In some implementations, the user device may additionally determine that the user is requesting authentication with the sensitive device. In some implementations, the user of the user device may provide input (e.g., via an input component) that instructs the user device to transmit (e.g., via near-field communication (NFC) or another type of wireless protocol) a request for authentication to the sensitive device. For example, the user may interact with an app in order to instruct the user device to perform an API call and thus transmit the request for authentication.

In response to being near the sensitive device, the user device may verify whether the user is engaged in a suspicious phone call, viewed a suspicious website, and/or viewed a suspicious email. Accordingly, as shown by reference number 310, the user device may determine whether to allow the user to proceed with authentication based on a status associated with a cellular connection of the user device or associated with one or more VOIP ports of the user device, based on a browsing history of the user device, and/or based on an indication of recent emails viewed on the user device. For example, the user device may determine whether an ongoing call (and/or a recent call) is suspicious, as described in connection with FIGS. 1A-1B, and may determine to proceed based on the ongoing call (and/or recent call) not being suspicious. Additionally, or alternatively, the user device may determine whether a website (in the browsing history) or an email message (of the recent emails) is suspicious, as described in connection with FIGS. 2A-2B, and may determine to proceed based on the website and/or the email message not being suspicious.

In some implementations, the user device may use an indication of whether the user device was engaged in a cellular call or was using a VoIP port for a call within a time window, the browsing history within the time window, and/or the recent emails within the time window. For example, the user device may determine whether the user device was engaged in a cellular call, or was using a VoIP port for a call, within the past 30 seconds, the past minute, or the past two minutes, among other examples. Additionally, or alternatively, the user device may determine the browsing history associated with, or indicate emails viewed within, the past 30 seconds, the past minute, or the past two minutes, among other examples. The time window may be a default value (e.g., stored in a memory of the user device) or may be indicated by the remote service (e.g., indicated in the request for the browsing history or the recent emails or stored in the memory of the user device based on a previous message from the remote service).

Accordingly, before allowing the user to proceed (e.g., with authentication at the sensitive device), the user device may verify whether the user is engaged in a suspicious call, viewed a suspicious website, and/or viewed a suspicious email, as described above. Therefore, the user device may generate an indication of whether to proceed. The indication may be a Boolean or another type of bit indicating the status (e.g., '0' or FALSE to indicate not to proceed and '1' or TRUE to indicate to proceed). In some implementations, shown by reference number 315, the user device may transmit, and the remote service may receive, an indication of whether to proceed. Accordingly, the remote service may instruct the sensitive device regarding whether to allow the user to proceed with authentication. Additionally, or alternatively, the user device may communicate (or refrain from communicating) with the sensitive device, based on the indication of whether to proceed, in order to allow (or prevent) the user from proceeding with authentication.

Although the example 300 is described in connection with the user device making the determination, other examples may include the user device transmitting an indication of the status, the browsing history, and/or the recent emails to the remote service (e.g., as described in connection with reference number 120 of FIG. 1A and/or reference number 210 of FIG. 2A). For example, the remote service may transmit, and the user device may receive, a request for the indication of the status, the browsing history, and/or the recent emails. The remote service may transmit the request in response to the user device and/or the sensitive device indicating that the user device is near the sensitive device. Additionally, or alternatively, the remote service may transmit the request in response to the sensitive device indicating that the user is requesting authentication with the sensitive device. The user device may transmit the indication of the status, the browsing history, and/or the recent emails in response to the request from the remote service.

As shown in FIG. 3B, the user device near the sensitive device is the same user device that determines whether to allow the user to proceed. Alternatively, the user device that determines whether to allow the user to proceed (or that transmits the indication of the status, the browsing history, and/or the recent emails to the remote service) may be a distinct device from the user device that is near the sensitive device. For example, the remote service may determine the user device from which to request the indication of the status, the browsing history, and/or the recent emails (e.g., similarly as described in connection with reference number 110 of FIG. 1A). For example, the user may carry a smartphone near the sensitive device, and the remote service may determine that the account is associated with a laptop or a desktop computer of the user.

In some implementations, and as shown by reference number 320*a*, the remote service may transmit, and the sensitive device may receive, a message based on the indication of whether to proceed. For example, the remote service may determine to provide an additional warning, as described herein. Accordingly, the remote service may transmit an instruction to warn the user about a possible scam based on the indication of the status (e.g., including a suspicious call), the browsing history (e.g., including a suspicious website), and/or the recent emails (e.g., including a suspicious email message). Additionally, or alternatively, the remote service may transmit, and the user device may receive, the message based on the indication of whether to proceed.

Additionally, or alternatively, and as shown by reference number 320*b*, the remote service may perform extra authentication. For example, the remote service may transmit, and the user device may receive, a request for confirmation based on the indication of the status (e.g., including a suspicious call), the browsing history (e.g., including a suspicious website), and/or the recent emails (e.g., including a suspicious email message). Therefore, the user device may transmit, and the remote service may receive, a confirmation message in response to the request for confirmation. In one example, the user may interact with a web browser executed by the user device in order to instruct the user device to transmit the confirmation message. In another example, the user may interact with an app executed by the user device (or with a push notification generated by the app) in order to instruct the user device to perform an API call and thus transmit the confirmation message. Accordingly, the remote service may instruct the sensitive device to proceed with authentication in response to the confirmation message.

In addition to, or in lieu of, transmitting a request for confirmation, the remote service may perform a two-factor authorization process based on the indication of the status (e.g., including a suspicious call), the browsing history (e.g., including a suspicious website), and/or the recent emails (e.g., including a suspicious email message). For example, the remote service may transmit a security code (e.g., an alphanumeric code) to a phone number (e.g., via a voice call or a text message) or to an email address associated with the account of the user. Accordingly, the user device may transmit the security code to the remote service. In one example, the user may interact with a web browser executed by the user device in order to instruct the user device to transmit the security code. In another example, the user may interact with an app executed by the user device (or with a push notification generated by the app) in order to instruct the user device to perform an API call with the security code as a parameter. Additionally, or alternatively, the remote service may transmit a prompt (e.g., a security question) associated with the account of the user to the user device. Accordingly, the user device may transmit a response (e.g., a security answer) to the remote service. In one example, the user may interact with a web browser executed by the user device in order to instruct the user device to transmit the response. In another example, the user may interact with an app executed by the user device (or with a push notification generated by the app) in order to instruct the user device to perform an API call with the response as a parameter. Accordingly, the remote service may instruct the sensitive device to proceed with authentication in response to the two-factor authorization process.

Alternatively, as shown by reference number 320*c*, the remote service may lock the account of the user based on the suspicious call, the suspicious website, and/or the suspicious email address. Accordingly, the account may remain locked until the user contacts an administrator associated with the remote service. Additionally, or alternatively, the user may perform (e.g., using the user device) an unlocking process (e.g., similar to the two-factor authorization process described herein).

In some implementations, the remote service may delete information received from the user device (e.g., the indication of whether to proceed) after instructing the sensitive device. As a result, the remote service increases security as well as conserving memory overhead. Alternatively, the remote service may use the information received from the user device to re-train a suspicion model (e.g., as described in connection with FIG. 1B and FIG. 2B).

Although the example 300 is described as implemented on the user device, other examples may include determining whether to proceed at the remote service. For example, the remote service may determine whether to proceed based on the status associated with a cellular connection or associated with one or more VOIP ports, the browsing history, and/or the recent emails. For example, the remote service may determine to proceed based on an ongoing call (and/or a recent call) not being suspicious, based on a website (from the browsing history) not being suspicious, and/or based on an email message not being suspicious but may determine not to proceed (or determine to provide an additional warning, similarly as described in connection with reference number 320*b*) based on the ongoing call (and/or recent call) being suspicious, based on the website being suspicious, and/or based on the email message being suspicious.

By using techniques as described in connection with FIGS. 3A-3B, the user device may determine whether to proceed with an action at the sensitive device based on whether the user recently viewed a suspicious website and/or a suspicious email. As a result, security is improved. Additionally, the user device refrains from instructing the sensitive device to perform actions that the user otherwise would not have requested, which conserves power and processing resources at the user device as well as at the sensitive device. Additionally, any actions the user device refrained from instructing will not need to be undone in the future, which further conserves power and processing resources that the user device and the sensitive device otherwise would have expended in undoing the actions.

As indicated above, FIGS. 3A-3B are provided as an example. Other examples may differ from what is described with regard to FIGS. 3A-3B.

Figure 4:
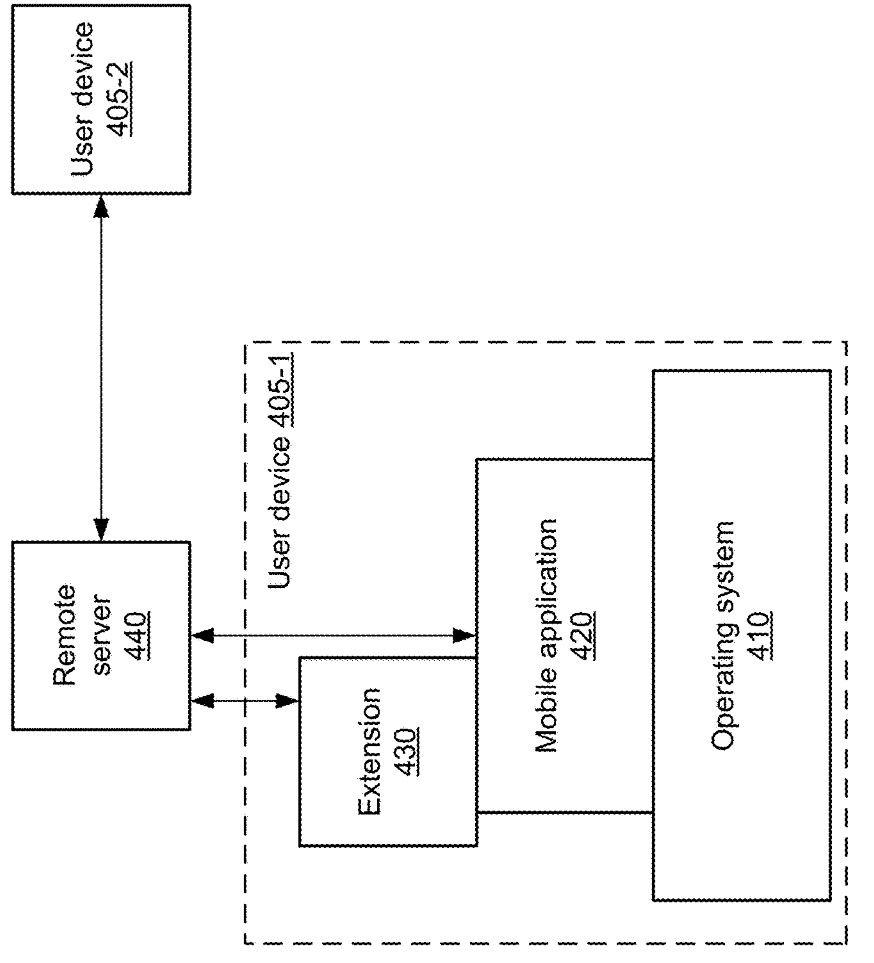
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a first user device 405-1 that executes an operating system 410, a mobile application (or "app") 420 (e.g., supported by the operating system 410), and an extension 430 (e.g., provided by the operating system 410 and used by the mobile application 420 or provided by the mobile application 420 for its own use), as described in more detail below. The environment 400 may further include a second user device 405-2. The user devices may each include a communication device. For example, the user devices may each include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user devices may each include an input component to facilitate interaction with a user. Example input components include a keyboard, a touchscreen, and/or a mouse. The user devices may each include an output component. Example output components include a display, a speaker, and/or a haptic vibrator. Additionally, as further shown in FIG. 4, environment 400 may include a remote server 440. Devices and/or elements of environment 400 may interconnect via wired connections and/or wireless connections.

Figure 5:
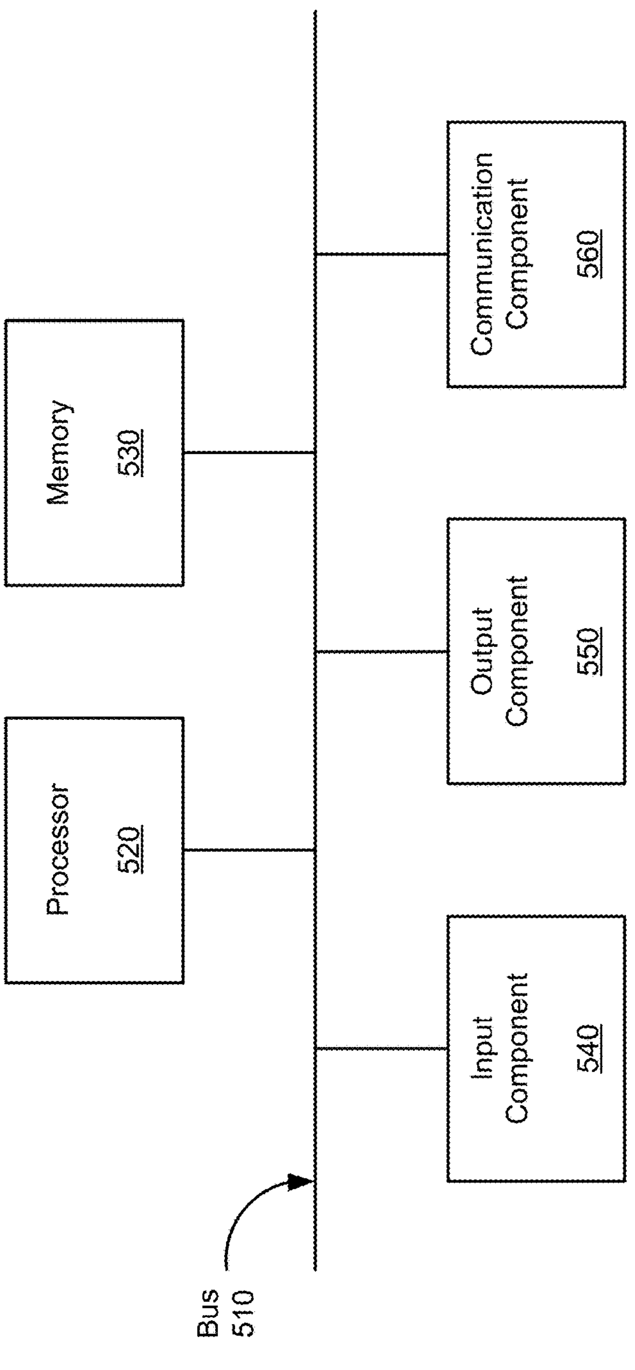
FIG. 5 is a diagram of example components of one or more devices of FIG. 4, in accordance with some embodiments of the present disclosure.

The operating system 410 may include system software capable of managing hardware of the user device (which may include, for example, one or more components of device 500 of FIG. 5) and providing an environment for execution of higher-level software, such as the mobile application 420. For example, the operating system 410 may include a kernel (e.g., a Windows-based kernel, a Linux kernel, a Unix-based kernel, such as an Android kernel, an iOS kernel, and/or another type of kernel) managing the hardware and library functions that may be used by the higher-level software. The operating system 410 may additionally provide a user interface (UI) and process input from a user. In some implementations, the operating system 410 may additionally provide the extension 430.

The mobile application 420 may include an executable capable of running on a user device using the operating system 410. In some implementations, the mobile application 420 may communicate with the remote server 440. For example, the mobile application 420 may use a hypertext transfer protocol (HTTP), a file transfer protocol (FTP), and/or another Internet- or network-based protocol to request information from, transmit information to, and receive information from the remote server 440. Additionally, the mobile application 420 may provide, or at least access, the extension 430, as described elsewhere herein. The mobile application 420 may support an extension, a plug-in, or another type of software that executes on top of the mobile application 420.

The extension 430 may include a built-in executable portion of the mobile application 420 or a shared library (or shared object) used by the mobile application 420. The extension 430 may generate messages including an indication of a status associated with the mobile application 420 (e.g., associated with a cellular connection or one or more VoIP ports used by the mobile application), a browsing history associated with the mobile application 420 (e.g., when the mobile application 420 includes a web browser), or recent emails associated with the mobile application 420 (e.g., when the mobile application 420 includes an email client).

The remote server 440 may include remote computing devices that provide information to requesting devices over the Internet and/or another network (e.g., a cellular network, a public land mobile network (PLMN), a local area network (LAN), a wide area network (WAN), a private network, the Internet, and/or a combination of these or other types of networks). The remote server 440 may provide a remote service, as described herein. The remote server 440 may include a standalone server, one or more servers included on a server farm, or one or more servers spread across a plurality of server farms. In some implementations, the remote server 440 may include a cloud computing system. As an alternative, the remote server 440 may include one or more devices, such as device 500 of FIG. 5, that may include a standalone server or another type of computing device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

FIG. 5 is a diagram of example components of a device 500 associated with authenticating users. The device 500 may correspond to a user device (e.g., user device 405-1 and/or user device 405-2), a remote server (e.g., remote server 440), and/or a sensitive device. In some implementations, the user device, the remote server, and/or the sensitive device may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
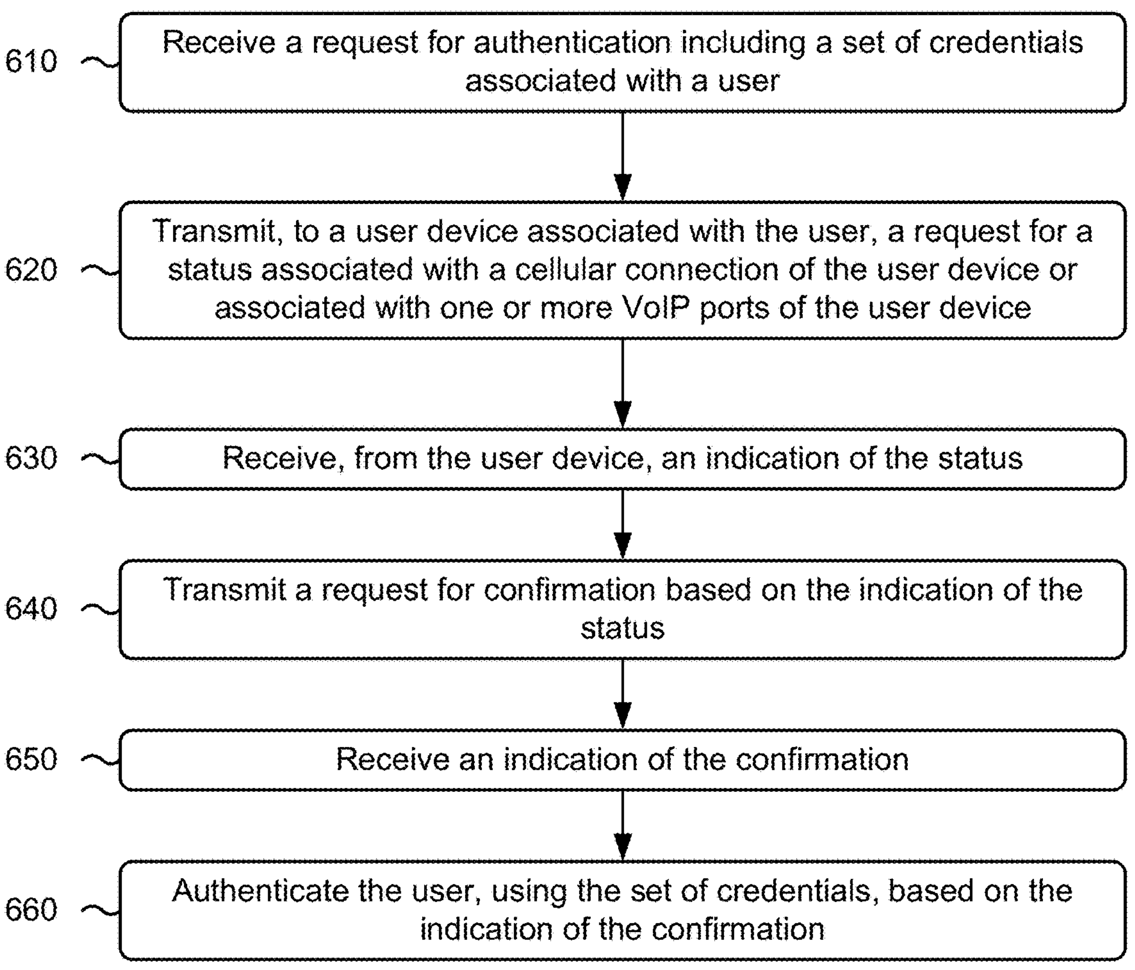
FIG. 6 is a flowchart of an example process relating to authenticating users, in accordance with some embodiments of the present disclosure.

FIG. 6 is a flowchart of an example process 600 associated with authenticating users. In some implementations, one or more process blocks of FIG. 6 may be performed by the remote server 440. In some implementations, one or more process blocks of FIG. 6 may be performed by another device or a group of devices separate from or including the remote server 440, such as the user device 405-2, the user device 405-1 and/or a sensitive device. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving a request for authentication including a set of credentials associated with a user (block 610). For example, the remote server 440 (e.g., using processor 520, memory 530, input component 540, and/or communication component 560) may receive a request for authentication including a set of credentials associated with a user, as described above in connection with reference number 105 of FIG. 1A. As an example, the user may navigate to a website (e.g., using a web browser executed by a user device) hosted by, or otherwise associated with, the remote server 440 and may interact with the website in order to instruct the user device to transmit the request for authentication. In another example, the user may interact with an app in order to instruct the user device to perform an API call and thus transmit the request for authentication.

As further shown in FIG. 6, process 600 may include transmitting, to a user device associated with the user, a request for a status associated with a cellular connection of the user device or associated with one or more VOIP ports of the user device (block 620). For example, the remote server 440 (e.g., using processor 520, memory 530, and/or communication component 560) may transmit, to a user device associated with the user, a request for a status associated with a cellular connection of the user device or associated with one or more VoIP ports of the user device, as described above in connection with reference number 115 of FIG. 1A. As an example, the user may have authorized the remote server 440 to request a cellular status and/or a VOIP status from an OS of the user device.

As further shown in FIG. 6, process 600 may include receiving, from the user device, an indication of the status (block 630). For example, the remote server 440 (e.g., using processor 520, memory 530, input component 540, and/or communication component 560) may receive, from the user device, an indication of the status, as described above in connection with reference number 120 of FIG. 1A. As an example, the user device may indicate whether the user device is engaged in a cellular call or is using a VoIP port for a call. In some implementations, the indication may be a Boolean or another type of bit indicating the status (e.g., '0' or FALSE to indicate no ongoing call and '1' or TRUE to indicate an ongoing call). In some implementations, the user device may additionally indicate a phone number and/or a contact name associated with the ongoing call. Additionally, or alternatively, the user device may additionally or alternatively indicate whether the user device was engaged in a cellular call or was using a VoIP port for a call within a time window.

As further shown in FIG. 6, process 600 may include transmitting a request for confirmation based on the indication of the status (block 640). For example, the remote server 440 (e.g., using processor 520, memory 530, and/or communication component 560) may transmit a request for confirmation based on the indication of the status, as described above in connection with reference number 135*b* of FIG. 1B. As an example, the remote server 440 may transmit, and the user device may receive, a request for confirmation based on the indication of the status being associated with a suspicious phone call.

As further shown in FIG. 6, process 600 may include receiving an indication of the confirmation (block 650). For example, the remote server 440 (e.g., using processor 520, memory 530, input component 540, and/or communication component 560) may receive an indication of the confirmation, as described above in connection with reference number 135*b* of FIG. 1B. As an example, the user may interact with a web browser executed by the user device in order to instruct the user device to transmit the confirmation message. In another example, the user may interact with an app executed by the user device (or with a push notification generated by the app) in order to instruct the user device to perform an API call and thus transmit the confirmation message.

As further shown in FIG. 6, process 600 may include authenticating the user, using the set of credentials, based on the indication of the confirmation (block 660). For example, the remote server 440 (e.g., using processor 520 and/or memory 530) may authenticate the user, using the set of credentials, based on the indication of the confirmation, as described above in connection with FIG. 1B. As an example, the remote server 440 may perform authentication in response to the confirmation message such that the user device may request the remote server 440 to perform an action.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1B, 2A-2B, and/or 3A-3B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for authenticating a user, the system comprising:
one or more memories; and
one or more processors, communicatively coupled to the one or more memories, configured to:
receive, from a first device associated with a user, a request for authentication including a set of credentials associated with the user;
determine, before authenticating the user and after receiving the request, whether the user is engaged in a call,
wherein the one or more processors, when determining whether the user is engaged in the call, are configured to:
transmit, to a second device associated with the user, a request for a status associated with a cellular connection of the second device or associated with one or more voice over Internet protocol (VOIP) ports of the second device;
receive, from the second device, an indication of the status; and
determine, based on the status, whether the user is engaged in the call;
transmit a request for confirmation based on the indication of the status;
receive an indication of the confirmation; and
authenticate the user, using the set of credentials, based on the indication of the confirmation.

2. The system of claim 1, wherein the request for authentication is received from the second device.

3. The system of claim 1, wherein the one or more processors, to transmit the request for confirmation based on the indication of the status, are configured to:
transmit the request for confirmation based on the indication of the status being associated with an ongoing call over the cellular connection or using the one or more VoIP ports.

4. The system of claim 3, wherein the one or more processors, to transmit the request for confirmation based on the indication of the status, are configured to:
receive an indication that an administrator associated with the system is not associated with the ongoing call; and
transmit the request for confirmation based on the administrator not being associated with the ongoing call.

5. The system of claim 3, wherein the status associated with the cellular connection of the second device indicates a telephone number of the ongoing call.

6. The system of claim 5, wherein the one or more processors, to transmit the request for confirmation based on the indication of the status, are configured to:
receive an indication that the ongoing call is not associated with a contact list stored on the second device; and
transmit the request for confirmation based on the ongoing call not being associated with the contact list.

7. The system of claim 1, wherein the second device is a pre-authorized device for requesting the status.

8. The system of claim 1, wherein a contact list associated with the second device is received with the indication of the status.

9. A non-transitory computer-readable medium storing a set of instructions, the set of instructions comprising:
one or more instructions that, when executed by one or more processors of a device, cause the device to:
receive, from a first device associated with a user, a request for authentication including a set of credentials associated with the user;
determine, before authenticating the user and after receiving the request, whether the user is engaged in a call,
wherein the one or more instructions, that cause the device to determine whether the user is engaged in the call, cause the device to:
transmit, to a second device associated with the user, a request for a status associated with a cellular connection of the second device or associated with one or more voice over Internet protocol (VoIP) ports of the second device;
receive, from the second device, an indication of the status; and
determine, based on the status, whether the user is engaged in the call;
transmit a request for confirmation based on the indication of the status;
receive an indication of the confirmation; and
authenticate the user, using the set of credentials, based on the indication of the confirmation.

10. The non-transitory computer-readable medium of claim 9, wherein the request for authentication is received from an additional second device.

11. The non-transitory computer-readable medium of claim 9, wherein the one or more instructions, that cause the device to transmit the request for confirmation based on the indication of the status, cause the device to:
transmit the request for confirmation based on the indication of the status being associated with an ongoing call over the cellular connection or using the one or more VoIP ports.

12. The non-transitory computer-readable medium of claim 11, wherein the one or more instructions, that cause the device to transmit the request for confirmation based on the indication of the status, cause the device to:
receive an indication that an administrator associated with the device is not associated with the ongoing call; and
transmit the request for confirmation based on the administrator not being associated with the ongoing call.

13. The non-transitory computer-readable medium of claim 11, wherein the status associated with the cellular connection of the second device indicates a telephone number of the ongoing call.

14. The non-transitory computer-readable medium of claim 13, wherein the one or more instructions, that cause the device to transmit the request for confirmation based on the indication of the status, cause the device to:
receive an indication that the ongoing call is not associated with a contact list stored on the second device; and
transmit the request for confirmation based on the ongoing call not being associated with the contact list.

15. The non-transitory computer-readable medium of claim 9, wherein the second device is a pre-authorized device for requesting the status.

16. A method, comprising:
receiving, by a first device and from a second device associated with a user, a request for authentication including a set of credentials associated with the user;
determining, by the device, before authenticating the user, whether the user is engaged in a call,
wherein determining whether the user is engaged in the call comprises:
transmitting, by the device, to a third device associated with the user, a request for a status associated with a cellular connection of the third device or associated with one or more voice over Internet protocol (VoIP) ports of the third device;
receiving, from the third device, an indication of the status; and
determining, based on the status, whether the user is engaged in the call;
transmitting, by the device, a request for confirmation based on the indication of the status;
receiving, by the device, an indication of the confirmation; and
authenticating, by the device, the user, using the set of credentials, based on the indication of the confirmation.

17. The method of claim 16, wherein the request for authentication is received from the third device.

18. The method of claim 16, wherein transmitting the request for confirmation based on the indication of the status comprises:
transmitting the request for confirmation based on the indication of the status being associated with an ongoing call over the cellular connection or using the one or more VoIP ports.

19. The method of claim 18, wherein transmitting the request for confirmation based on the indication of the status comprises:
receiving an indication that an administrator associated with the device is not associated with the ongoing call; and
transmitting the request for confirmation based on the administrator not being associated with the ongoing call.

20. The method of claim 18, wherein the status associated with the cellular connection of the second device indicates a telephone number of the ongoing call.

* * * * *